United States Patent [19]

Schmid et al.

[11] Patent Number: 4,825,570
[45] Date of Patent: May 2, 1989

[54] LIFT SYSTEM FOR FRONT-MOUNTED IMPLEMENTS FOR LAWN AND GARDEN TRACTORS

[75] Inventors: Steven L. Schmid, Agency; Larry D. Hining, Ottumwa, both of Iowa

[73] Assignee: Deere & Company, Moline, Ill.

[21] Appl. No.: 146,650

[22] Filed: Jan. 21, 1988

[51] Int. Cl.⁴ .............................................. E01H 5/04
[52] U.S. Cl. ....................................... 37/231; 172/817
[58] Field of Search ................ 37/231, 244, 272, 279, 37/117.5; 172/452, 479, 817, 272, 482

[56] References Cited

U.S. PATENT DOCUMENTS

| | | | |
|---|---|---|---|
| 1,776,878 | 9/1930 | Alwin | 37/272 |
| 1,788,879 | 1/1931 | Lile et al. | 37/272 |
| 1,957,771 | 5/1934 | Gettelman | 37/272 |
| 2,006,761 | 7/1935 | Frink | 37/272 |
| 2,131,872 | 10/1938 | Galpin | 172/482 |
| 2,171,830 | 9/1939 | Hayes | 172/482 |
| 2,426,410 | 8/1947 | Owen | 37/231 |
| 3,440,739 | 4/1969 | Manke | 37/231 |
| 3,588,147 | 6/1971 | Ewters | 172/272 |
| 3,721,025 | 3/1973 | Orr | 37/43 E |
| 3,815,687 | 6/1974 | Federspiel | 172/272 |

FOREIGN PATENT DOCUMENTS 86749  7/1936  Sweden .................... 37/272

OTHER PUBLICATIONS

John Deere 110 Series Lawn and Garden Tractor Operator's Manual (Om-M40832), pp. 8, 11 and 49, dated 8/1964.
John Deere 32 Snow Thrower for 60 Lawn Tractor Operator's Manual (OM-M41687), pp. 8, 9 and 13, dated 2/1966.
John Deere 37A Snow Thrower Operator's Manual (OM-M81431), Issue F6, pp. 4, 8, 9, 13 and 14, dated 6/1966.

*Primary Examiner*—Eugene H. Eickholt

[57] ABSTRACT

A front-mounted snowblower is pivotally attached to a midmount location at the underside of a tractor frame by a pair of lift arms that extend between the tractor front wheel. A rockshaft is pivotally attached to the snowblower at a location forwardly of the tractor and is linked to brackets carried by the tractor axle. The rockshaft includes a transversely offset arm to which the forward end of a lift link is coupled, the rear end of the lift link being coupled to a lift handle located beside the tractor operator station and secured to the outer end of a support bracket fixed to rear end portions of the lift arms. The mounting of the handle to the bracket releases the handle from the bracket upon the handle being swung forwardly beyond a normal working range thereby permitting the implement lift arms to be moved between the tractor front wheels during attachment and detachment operations.

12 Claims, 4 Drawing Sheets

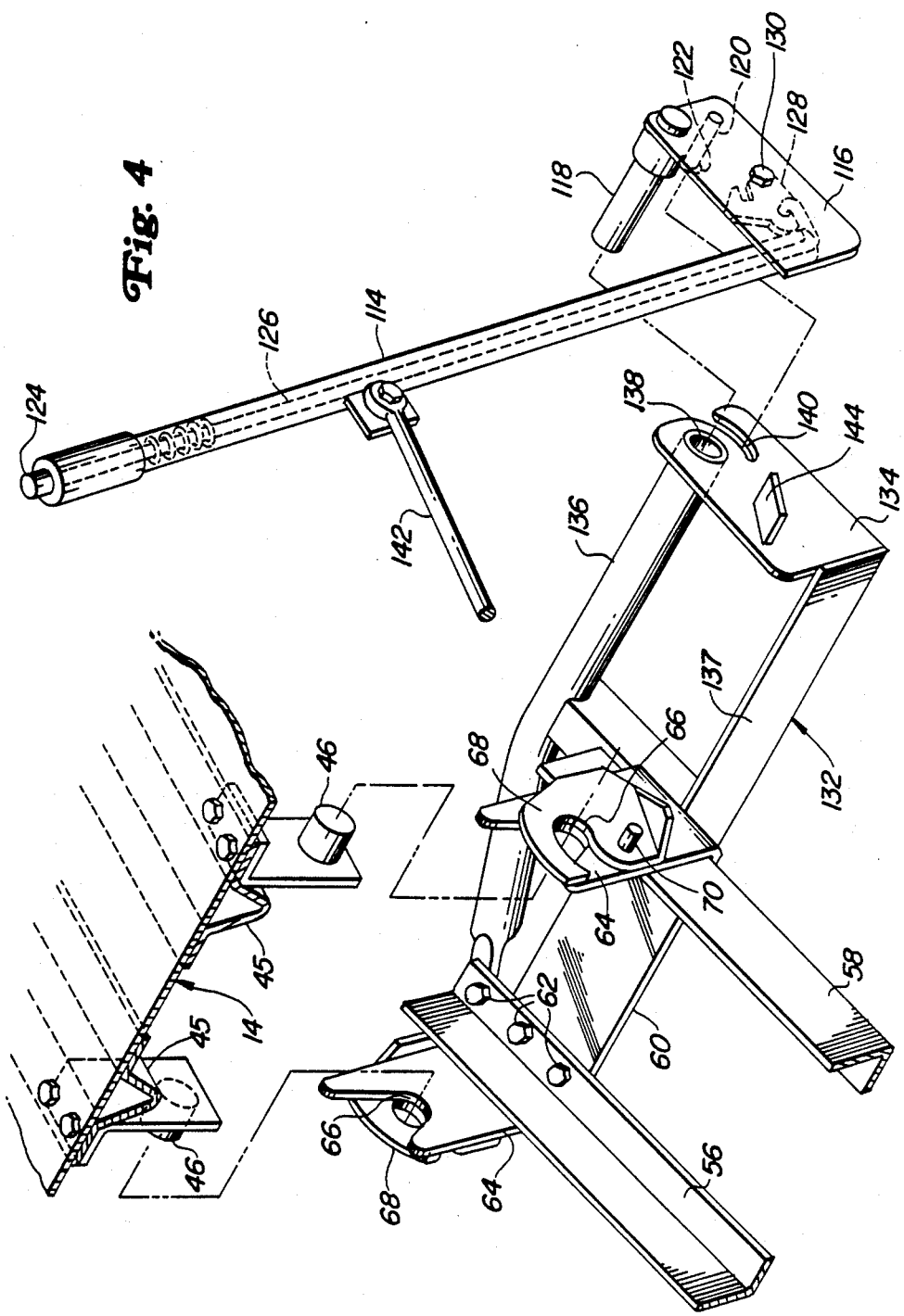

LIFT SYSTEM FOR FRONT-MOUNTED IMPLEMENTS FOR LAWN AND GARDEN TRACTORS

BACKGROUND OF THE INVENTION

The present invention relates to lift systems for implements adapted for attachment to lawn and garden tractors and more specifically relates to lift systems for front-mounted implements.

Lawn and garden tractors are usually provided with a lift system for raising and lowering the working elements of mid-, rear- or front-mounted implements. A common way of attaching front-mounted implements to the tractor is to releasably fix a support bracket to the forward end of the tractor main frame and to mount the implement to the bracket by fasteners establishing a horizontal, transverse axis about which structure carrying the working element is vertically swingable. The lift systems of these tractors often include a hand lever located adjacent the tractor seat and coupled for rocking a main rockshaft mounted in the tractor main frame or in a pedestal carried by the frame. Movement of this lever is transferred to the structure carrying the working element either directly through a link coupled between the lever and the structure or indirectly by a linkage connected between the main rockshaft and the structure, such linkage often including one or more additional rockshafts rotatably mounted in the tractor frame and linked for being rotated when the main rockshaft is rotated.

It is also known to provide a lift system which is embodied in the front-mounted implement. Specifically, U.S. Pat. No. 3,721,025 discloses a snowblower including a support bracket mounted to downwardly projecting flanges provided on a forward underside portion of the tractor main frame. A pair of longitudinally extending transversely spaced arms have their forward ends rigidly fixed to the snowblower housing and their rearward ends are pivotally mounted to a rear portion of the support bracket for vertical swinging movement about a horizontal transverse axis. A hand lever is mounted to one end of a rockshaft carried by an upper forward portion of the support bracket and is linked to the spaced arms of the snowblower whereby pivoting of the lever back and forth effects raising and lowering of the arms and thus raising and lowering of the snowblower housing.

These known lift systems have the disadvantage that their support brackets are rather cumbersome to mount onto the tractor frame. A further disadvantage is that some tractors for economy purposes may be built in a uni-body fashion resulting in their not having requisite framework at the forward end of the tractor for permitting support brackets to be secured thereto or may be built such that their lift systems are not structurally suited for connection to front-mounted implements. While the afore-described patented structure overcomes this latter deficiency by embodying the lift system in the implement structure, the location of the handle is too far forwardly from the tractor seat and cannot be easily manipulated by a seated operator.

SUMMARY OF THE INVENTION

According to the present invention there is provided an improved lift system for an easily attachable and detachable front-mounted implement for a lawn and garden tractor.

An object of the invention is to provide a lift system which is incorporated into the front-mounted implement structure and requires only minimal structure to be attached to the tractor.

A more specific object of the invention is to provide a front-mounted implement lift system including a rockshaft mounted to the implement frame and having spaced crank arms couplable to opposite sides of the forward end of a lawn and garden tractor frame by a pair of link assemblies, this attachment in the case of economy tractors being to supports carried by the tractor front axle.

A further object of the invention is to provide, in conjunction with an elongate implement frame adapted to be inserted beneath the forward end of a lawn and garden tractor, a lift system including a rockshaft coupled to a forward location of the frame and a lift handle coupled to a rear location of the frame and linked to the rockshaft.

Yet another object of the invention is to provide a lift system as set forth in the previous object wherein the handle is mounted for quick disconnection from the implement frame to facilitate movement of the frame beneath the tractor.

Another object of the invention is to provide a lift system embodied in a front-mounted implement and including a counterbalance or lift helper spring adjuster of simple construction.

These and other objects, features and advantages of the present invention will become apparent to those skilled in the art from the description which follows and from the drawings.

BRIEF DESCRIPTION OF THE DRAWINGS

FIG. 4 is a left rear, partially exploded, perspective view showing a rearward portion of the lift system.

DESCRIPTION OF THE PREFERRED EMBODIMENT

Figure 1:
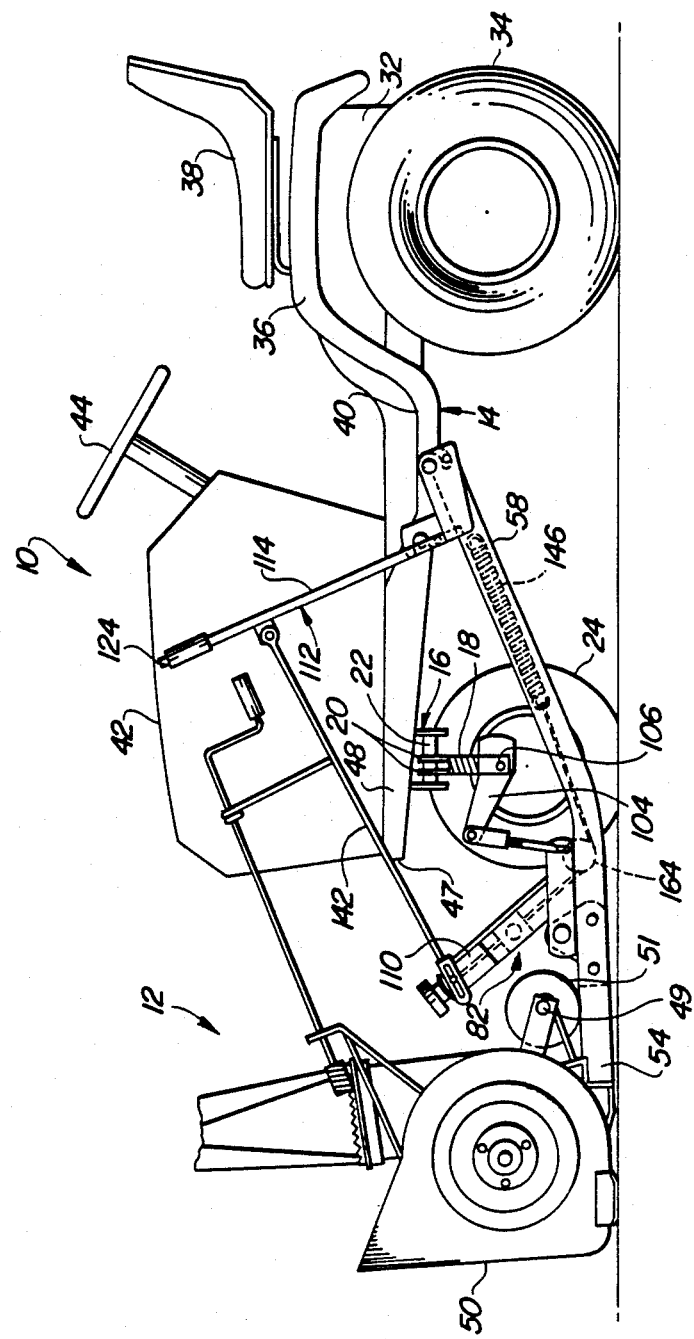
FIG. 1 is a left side elevational view, with some parts broken away and others omitted for clarity, of an economy lawn and garden tractor having a uni-body frame construction and to which a front-mounted snowblower is attached, the snowblower including a lift system constructed in accordance with the present invention and being shown in a condition wherein the snowblower is lowered for operation.
Figure 2:
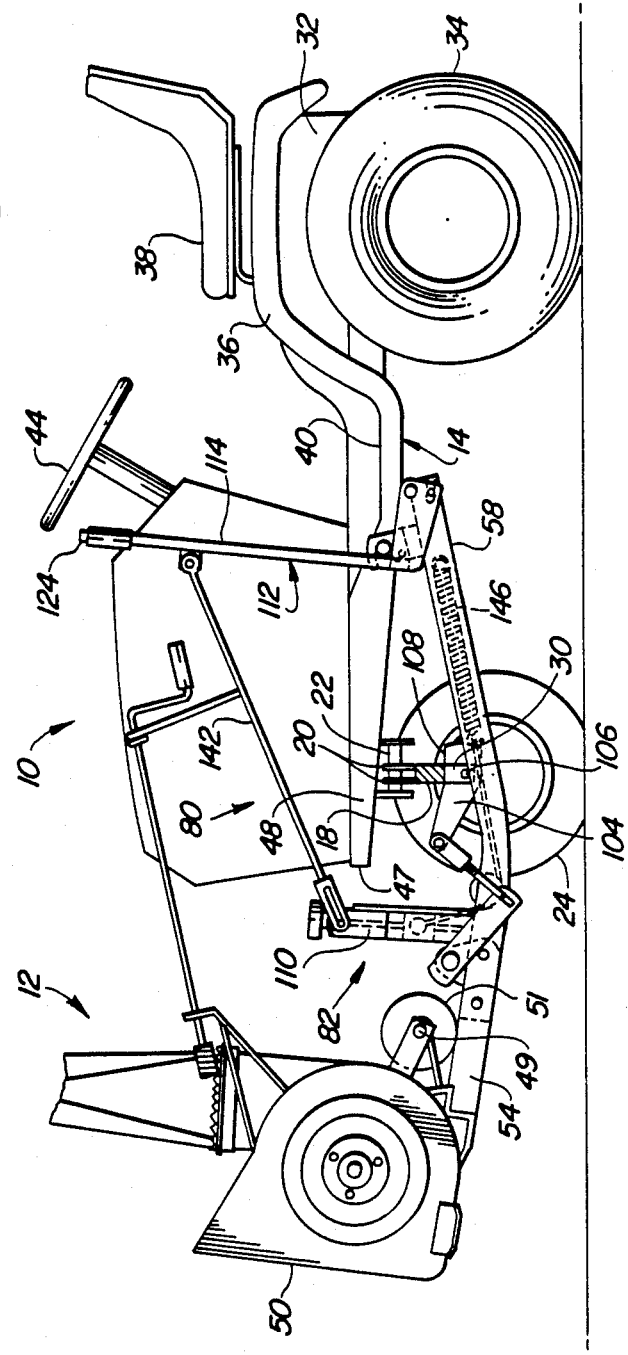
FIG. 2 is a view similar to FIG. 1 but showing the lift system in a condition wherein the snowblower is held raised for transport.
Figure 3:
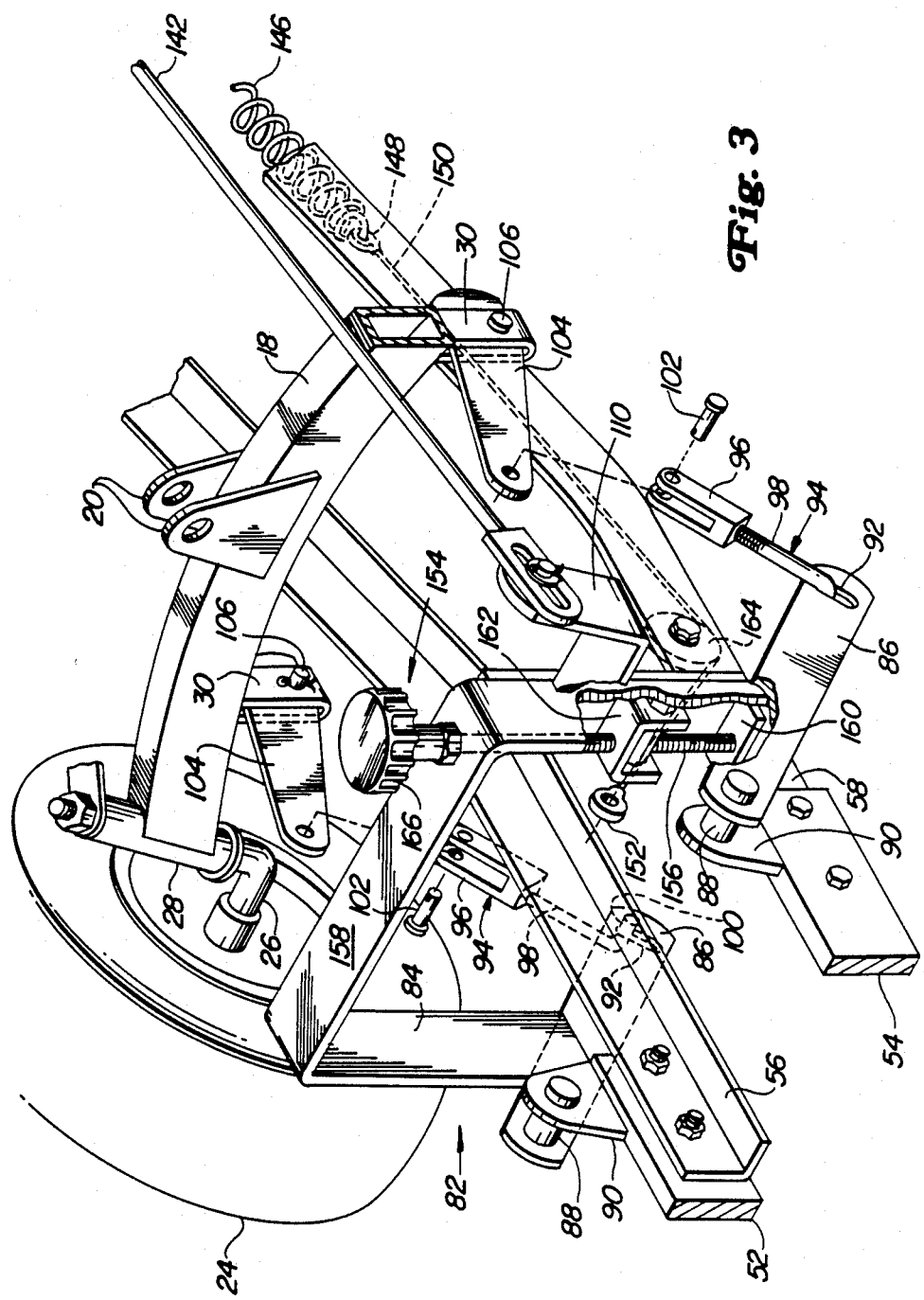
FIG. 3 is a left front, partially exploded, perspective view showing a forward portion of the lift system and its attachment to the tractor.

Referring to FIGS. 1–3, there is shown a lawn and garden tractor 10 to which is attached a front-mounted implement, here shown as a snowblower 12. The tractor 10 is a relatively small, economy type including a one-piece stamped metal frame 14 having transverse angle members bolted to a central, forward underside location thereof so as to form an axle support bracket 16. A bowed axle 18 has a central mounting portion 20 received for pivoting about a horizontal, fore-and-aft extending pivot structure 22 carried by the bracket 16. Steerable front wheels 24 are mounted to spindles 26 rotatably received in upright tubular members 28 welded to opposite ends of the axle. A pair of U-shaped hanger brackets 30 are fixed, as by welding, so as to depend from the underside of the axle 18 at respective locations spaced equidistant from the clevis 20. A transaxle housing 32 is bolted to a central rear underside location of the frame 14 and supports oppositely projecting drive axles (not shown) on which are mounted rear drive wheels 34. The frame is shaped to include fenders 36 which extend over the wheels 34 and an operator seat 38 is bolted to the top of the frame at a central location between the fenders. The fenders 36 blend into respective foot rests 40 at their forward ends. An engine (not shown) is bolted to a central forward area of the top of the frame 14 and is located within a housing 42. The rear portion of the housing 42 defines a pedestal supporting various operator controls of which only a steering assembly 44 is shown. Visible only in FIG. 4 are a pair of transversely spaced upwardly opening channel members 45 that form stiffeners for the frame 14. These channel members 45 are stamped from sheet metal so as to be hat-shaped in cross section and are bolted to extend longitudinally beneath a central area of the frame from a region adjacent the axle support bracket to a region located between the foot rests 40. Mounted to the frame 14 together with the channel members 45 at respective locations inwardly of the foot rests 40 are a pair of L-shaped implement mounting brackets respectively including outwardly projecting implement mounting pins 46. A bumper 47 of the tractor is defined by a downturned flange 48 which is formed about the periphery of the frame 14. Thus it will be appreciated that neither the frame 14 nor the channel members 45 lend themselves to having heavy brackets and the like secured thereto for attaching implements and/or lift systems for such implements thereto.

Referring now also to FIG. 4, it can be seen that the snowblower 12 includes a blower housing 50 which serves to support the working elements (not shown), i.e., the gathering auger and impeller of the snowblower. A drive shaft 49 is supported at the rear of the housing 50 and respectively fixed to right and left ends of the shaft are a chain sprocket (not shown) coupled for driving the auger and impeller, and a belt sheave 51. A belt drive for coupling the sheave 51 to a sheave carried by an output shaft of the tractor engine would normally be carried by snowblower structure (described below) extending beneath the tractor 10 but is omitted here for clarity. Commonly assigned U.S. patent application Ser. No. 076,638 filed on July 23, 1987 discloses such a drive and may be referred to if desired. Fixed to the lower rear portion of the blower housing 50 are parallel, transversely spaced, rearwardly projecting right and left straps 52 and 54, respectively. A pair of elongate angle members form right and left lift arms 56 and 58 respectively having their forward ends rigidly bolted to the straps 52 and 54 such that the arms form rearward continuations of the straps. A U-shaped mounting bracket 60 has rear portions of the arms 56 and 58 received therein and fixed thereto by bolts 62. Opposite upstanding legs 64 of the bracket 60 are provided with upwardly opening V-shaped receptacles 66 engaged with the mounting pins 46 with the latter being captured in place by releasable latches 68 pivotally mounted on outwardly projecting pins 70 carried by the legs 64. Thus, the snowblower 12 is mounted for being raised and lowered about a horizontal transverse axis defined by the pins 46. The snowblower structure described up to this point is more or less conventional.

Mounted to and thus forming part of the snowblower 12 is a lift system 80. Specifically, the lift system 80 includes a rockshaft 82 in the form of an inverted U-shaped strap 84 to opposite legs of which are respectively fixed a pair of downwardly and rearwardly inclined output crank arms 86, the forward ends of which respectively carry a pair of inwardly projecting pivot pins 88 that are journalled for rotation in bearings (not shown) carried by a pair of upstanding lugs 90. fixed integrally with the straps 52 and 54, and the rearward ends of which are provided with elongate openings 92. Thus, the rockshaft 82 is mounted for swinging about a horizontal transverse axis established by the pins 88. A pair of length-adjustable lift and leveling links 94 each include a clevis 96 screwed on a threaded end of a rod 98 having a hook 100 at its opposite end received in a respective holes 92 of the crank arms 86. The clevises 96 are respectively pinned, as by pins 102, to forward ends of support arms 104, the arms 104 having respective rear portions received in a respective one of the hanger brackets 30 and secured to the latter by a pin 106. It is to be noted that the arms 104 each include an upper surface 108 engaged with a lower surface of the axle 18 whereby the arms 104 are prevented from pivoting about the pins 106. Fixed to the left side of the rockshaft strap 84, as by conventional welding is an inner end of a transverse leg portion of an L-shaped input crank arm 110. A lift handle assembly 112 is provided for selectively raising and lowering the snowblower housing 50 between lowered working and raised transport positions respectively shown in FIGS. 1 and 2. As can best be seen in FIG. 4, the lift handle assembly 112 includes an upright handle 114 having its lower end welded to a forward, inside location of a fore-and-aft extending vertical plate 116. An inwardly projecting pivot shaft 118 is fixed in a rear portion of the plate 116 and an inwardly projecting handle retaining pin 120 is fixed in the plate below the shaft 118 and has a head 122 at its inward end. A thumb-operated button 124 is located at the top of the handle 114 and is operatively coupled, via a rod 126 located in the handle, to a latch element 128 pivotally mounted to the plate 116 by a pin 130. A handle support frame 132 is bolted to rear end portions of the lift arms 56 and 58 and projects transversely so as to place an outer end thereof beyond the left foot rest 40 of the tractor. The outer end of the frame 132 is defined by a fore-and-aft extending, vertical plate 134 having a rear portion fixed to a horizontal, transverse portion of a tubular frame member 136 and a forward portion fixed to a transverse, vertical plate 137. A hole provided in the plate 134 receives an open outer end of the frame member 136, the latter thus forming a tubular receptacle 138 rotatably receiving the pivot shaft 118. Located in the plate 134 below the receptacle 138 is a slot 140 formed arcuately about the receptacle at a radius equal to the distance between the pin 120 and shaft 118. The slot 140 has an entrance at the rear of the plate 134 and the retaining pin 120 is received in the slot. The length of the slot 140 is such that the pin 120 will be located within the slot over the full working range of the handle 114 in moving the snowblower housing between its working and transport positions through means of a lift rod 142 coupled between the handle 114 and an upwardly projecting leg of the L-shaped input crank arm 110 of the rockshaft 82. The head 122 of the pin is dimensioned to prevent it from moving sideways through the slot and thus retains the handle 114 in place during operation. A latch plate 144 is fixed to the plate 134 so as to be engageable by the latch element 128 when the handle 114 is swung rearwardly to lift the snowblower to its transport position.

When mounting the snowblower 12 on or removing the snowblower from the tractor 10 it is necessary to remove the handle 114 so as to permit the lift arms 56 and 58 to be moved between the front tractor wheels 24. Once the lift rod 142 is disconnected from the handle 114, the latter may be swung forwardly beyond its working range, thus removing the pin 120 from the slot 140 and permitting the lever 114 to be removed from the frame 132 by moving the lever sideways. Thus, the lever 114 may be easily attached to or detached from the frame 132 without the use of tools.

An adjustable lift assist is also carried by the snowblower Specifically, this lift assist includes a coil tension lift assist spring 146 located along a rear portion of the left lift arm 58 and having its rear end attached to the lift arm and its forward end attached to an eye 148 carried at one end of a cable 150 having a similar eye 152 at its forward end. A tension adjusting mechanism 154 includes a hand-adjustable screw 156 extending through and having an upper portion rotatably mounted in a leftward location of a transverse portion 158 of the U-shaped rockshaft strap 84 and a lower portion rotatably mounted in a transverse tab 160 fixed to and projecting inwardly from the left leg of the strap 84. A traveling nut assembly 162 is received on the screw 156 and is retained from rotation by a vertical gusset plate 164 secured to the left forward side of the strap 84. A pin (not visible) at the right end of the nut assembly 162 has the forward eye 152 of the cable 150 received thereon. The cable 150 is engaged with the lower surface of a cable guide pulley 164 mounted to the left lift arm 58 ahead of the rockshaft 82. Thus, it can be seen that by grasping and rotating a knob 166 fixed to the top of the screw 156 the traveling nut assembly 162 will travel either up or down depending on the direction the knob is rotated and will result in an increase or decrease in the tension of the lift assist spring 146.

The operation of the lift system 112 is briefly described as follows. Assuming the snowblower 12 to be detached from the tractor 10 and laying on a relatively level surface ahead of the tractor, it can be readied for attachment to the tractor by first disconnecting the handle 114 from its support frame 132. This is accomplished by disconnecting the lift rod 142 from the handle and rotating the latter forwardly so as to remove the pin 120 from the slot 140. The handle 114 can then be removed from the frame 132 by moving it sideways. With the handle 114 removed, the snowblower can be rolled about on its transport wheels (not shown but located just rearwardly of the housing 50) so as to move the lift arms 56 and 58 between the front wheels and beneath the tractor so as to dispose the receptacles 66 beneath the implement attachment pins 46 carried by the tractor. The snowblower 12 is then rocked downwardly about its transport wheels to engage the receptacles 66 with the pins 46. The latches 68 are then rotated to their latching positions. Next, the lift handle 114 is moved into place on the frame 132 and the rod 142 is reconnected to the lever 114. The support arms 104 are then inserted in and connected to the hanger brackets 30 carried by the axle 18. The snowblower can then be raised about the pins 46 by pulling back on the lever 114 to effect rearward swinging movement of the rockshaft 82 resulting in the output crank arms 86 moving downwardly and pulling on the links 94 to raise the snowblower. The lever 114 may be latched to hold the snowblower in its raised transport position by manipulating the thumb button 124 to move the rod 126 and move the latch element 128 into engagement with the latch plate 144. If it then appears that the snowblower is not level from side-to-side, such leveling can be accomplished by releasing the latch element 128, lowering the housing 50 to the ground, disconnecting one or the other of the links 94 and making the necessary length adjustment thereto. The link 94 is then reconnected. At this time the assist spring tension can be adjusted by turning the knob 166 in the appropriate direction. The snowblower lift system is then ready for operation.

I claim:

1. In a front-mounted implement including a working element support frame, a pair of elongate transversely spaced lift arms having forward ends fixed to the support frame and a quick-attach coupling means mounted to rear ends of the lift arms, with the implement being adapted for attachment to a lawn and garden tractor such that the support frame is in front of the tractor, the lift arms extend beneath the tractor and the coupling means pivotally mounts the lift arms to the tractor for swinging about a horizontal, transverse pivot axis, an improved lift system comprising: a rockshaft mounted to the support frame for pivoting about a horizontal, transverse rock axis and including a pair of parallel crank arms; a pair of links respectively having first ends pivotally connected to the pair of crank arms and second ends adapted for being pivotally connected to the tractor; and lift means connected to the rockshaft and selectively operable for swinging the latter about said rock axis between a first position, corresponding to a lowered working position of the support frame, and a second position corresponding to a raised, transport position of the support frame.

2. The front-mounted implement defined in claim 1 wherein said pair of links each include length adjustable means whereby said links may be used to level said support frame from side-to-side.

3. The front-mounted implement defined in claim 1 wherein a handle support bracket is fixed to and projects transversely to one side from rear end portions of the pair of lift arms a distance sufficient to dispose an outer end portion of the bracket beside the tractor adapted to carry the implement; and said lift means includes a lift handle pivotally mounted to said outer end portion for fore-and-aft rocking movement and a link coupled between said handle and said rockshaft.

4. The front-mounted implement defined in claim 3 wherein said handle support bracket defines an outwardly opening, horizontal, tubular socket; said handle including an inwardly projecting shaft received for pivotal movement in said socket; and means for releasably retaining said shaft within the socket.

5. The front-mounted implement defined in claim 4 wherein said means for releasably retaining said shaft within the socket includes a latch pin carried by the handle and projecting inwardly in spaced parallel relationship to said shaft and having a head at its inner end; a fore-and-aft extending vertical plate forming an outer portion of said handle support bracket and containing a hole forming an inlet of said tubular socket and containing a rearwardly opening slot receiving said pin and formed arcuately about said hole at a radius equal to the distance between the latch pin and shaft, with the slot being sized so as to prevent the pin head from moving outwardly therethrough and having a length for accommodating said pin throughout a range of fore-and-aft movement of the handle for effecting movement of the working element support frame between its lowered and raised position but for permitting the pin to be removed therefrom to permit sideways movement of the handle relative to the handle support bracket once the link connecting the handle to the rockshaft is removed and the handle is moved forwardly beyond that position corresponding to the lowered position of the working element support frame.

6. The front-mounted implement defined in claim 1 wherein said lift means includes an elongate tension spring extending coextensive with one of said pair of lift arms and having a rear end coupled thereto; said rockshaft being formed in part by an inverted U-shaped member having opposite legs pivotally mounted for swinging about said rock axis and joined together by a transverse section; a helper spring tension adjuster mounted to the rockshaft and including a manually rotatable screw extending through the transverse section of the U-shaped member; a traveling nut structure carried by the screw; and a cable having opposite ends respectively connected to a forward end of the spring and to the traveling nut structure.

7. In combination with a lawn and garden tractor including a main frame formed at least in part by a pair of transversely spaced, longitudinally extending frame members supported on rear and front pairs of wheels with the front pair being carried at opposite ends of a transverse axle mounted to a bracket, joining forward portions of the pair of frame members, for swinging about a horizontal longitudinal axis and an operator's station including a seat located between the rear pair of wheels, a front-mounted implement, comprising: a working element support structure; a pair of transversely spaced longitudinally extending lift arms forming a rearward extension of the support structure and extending beneath the tractor and between the pair of front wheels; means releasably coupling rear portions of the arms to the pair of frame members for pivoting about a first horizontal, transverse axis located adjacent the operator's station; a rockshaft structure pivotally connected to the support structure at a location forwardly of the tractor for swinging about a second horizontal, transverse axis and including a pair of parallel, transversely spaced crank arms; bracket means carried by the forward portion of the tractor; a pair of lift links having respective first ends connected to the crank arms and respective second ends coupled to the bracket means; and a lift means coupled to the rockshaft for selectively swinging the latter about said second axis for swinging the lift arms and hence the working element support structure about said transverse axis between raised and lowered positions.

8. The combination defined in claim 7 wherein said bracket means includes first and second support arms respectively mounted to the axle at first and second locations spaced equidistant from said longitudinal axis and said pair of links respectively being connected to the first and second support arms.

9. The combination defined in claim 7 wherein a lift handle support bracket is secured to rear portions of said pair of lift arms and includes an outer end located beside said tractor adjacent the operator's station; and said lift means including a lift handle mounted to the outer end of said lift handle support bracket for fore-and-aft swinging movement and a lift link interconnected between the lift handle and rockshaft.

10. The combination defined in claim 9 wherein said lift handle support bracket defines a horizontal, tubular socket having an open end located at said outer end of the lift handle support bracket; and said handle carrying an inwardly projecting shaft rotatably received in said socket.

11. The combination defined in claim 10 and further including releasable latch means for preventing the handle from moving outwardly relative to the lift handle support bracket outer end when the handle is swinging in a working range of movement commensurate with that necessary for effecting movement of the working element support structure between its raised and lowered positions but for releasing the handle, upon disconnection of the lift link from and forward swinging of the handle beyond its working range, for sideways movement for separating the handle from the handle support bracket.

12. The combination defined in claim 8 wherein said bracket means further includes first and second U-shaped brackets having upper ends fixed to an underside of the tractor axle respectively at said first and second locations so as to cooperate with the axle to respectively define first and second fore-and-aft openings; said first and second support arms respectively being snugly received in the first and second openings; and first and second transverse pins respectively extending through the first and second U-shaped brackets and the first and second support arms and serving as the sole means retaining the support arms in the brackets.

* * * * *